US011391292B2

(12) United States Patent
Shakuda et al.

(10) Patent No.: US 11,391,292 B2
(45) Date of Patent: Jul. 19, 2022

(54) SEAL GAS SUPPLY CONTROL METHOD, SEAL GAS SUPPLY CONTROL APPARATUS, AND ROTARY MACHINE

(71) Applicant: MITSUBISHI HEAVY INDUSTRIES COMPRESSOR CORPORATION, Tokyo (JP)

(72) Inventors: Masaki Shakuda, Hiroshima (JP); Masahiro Hayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 572 days.

(21) Appl. No.: 15/524,366

(22) PCT Filed: Jul. 2, 2015

(86) PCT No.: PCT/JP2015/069134
§ 371 (c)(1),
(2) Date: May 4, 2017

(87) PCT Pub. No.: WO2016/080014
PCT Pub. Date: May 26, 2016

(65) Prior Publication Data
US 2018/0245600 A1    Aug. 30, 2018

(30) Foreign Application Priority Data

Nov. 20, 2014 (JP) .............................. JP2014-235452

(51) Int. Cl.
F04D 29/12 (2006.01)
F01D 11/06 (2006.01)
(Continued)

(52) U.S. Cl.
CPC ............ F04D 29/124 (2013.01); F01D 11/06 (2013.01); F04D 17/10 (2013.01); F16J 15/3404 (2013.01);
(Continued)

(58) Field of Classification Search
CPC ...... F04D 29/10; F04D 29/102; F04D 29/104; F04D 29/124; F04D 17/10; F16J 15/3404;
(Continued)

(56) References Cited

U.S. PATENT DOCUMENTS 4,005,580 A * 2/1977 Swearingen ............ F01D 11/04
                                                         184/6
2002/0084591 A1* 7/2002 Akazawa ............... F16J 15/004
                                                         277/345
(Continued)

FOREIGN PATENT DOCUMENTS

JP      2012-87724 A       5/2012
WO  WO 2011/061142 A1      5/2011

OTHER PUBLICATIONS

International Search Report (Form PCT/ISA/210) issued in International Application No. PCT/JP2015/069134, dated Oct. 6, 2015, together with an English translation.

(Continued)

Primary Examiner — Dominick L Plakkoottam
Assistant Examiner — Charles W Nichols
(74) Attorney, Agent, or Firm — Birch, Stewart, Kolasch & Birch, LLP

(57) ABSTRACT

A seal gas supply control method according to the present invention comprises a step for detecting a pressure difference between an internal pressure of a rotary machine and a supply pressure of a seal gas with respect to a dry gas seal portion, a step for adjusting an opening degree of a seal gas supply valve on the basis of the detected pressure difference (Continued)

between the internal pressure and the supply pressure, and a step for detecting a vent pressure for discharging the seal gas evacuated from the dry gas seal portion to the outside. The seal gas supply control method fully opens the seal gas supply valve when the detected vent pressure satisfies a predetermined condition.

3 Claims, 5 Drawing Sheets

(51) Int. Cl.
*F04D 17/10* (2006.01)
*F16J 15/34* (2006.01)

(52) U.S. Cl.
CPC ..... *F16J 15/3492* (2013.01); *F05D 2270/301* (2013.01); *F05D 2270/3015* (2013.01)

(58) Field of Classification Search
CPC ....... F16J 15/3492; F01D 11/04; F01D 11/06; F05D 2270/301; F05D 2270/3015
See application file for complete search history.

(56) References Cited

U.S. PATENT DOCUMENTS

| | | |
|---|---|---|
| 2007/0147988 A1 | 6/2007 | Ito et al. |
| 2012/0093643 A1 | 4/2012 | Alfes |
| 2013/0115049 A1* | 5/2013 | Grieshaber ............ F16J 15/342 |
| | | 415/111 |
| 2015/0211379 A1* | 7/2015 | Doumecq-Lacoste ...................... |
| | | F01D 21/003 |
| | | 415/1 |

OTHER PUBLICATIONS

Written Opinion of the International Searching Authority (Form PCT/ISA/237) issued in International Application No. PCT/JP2015/069134, dated Oct. 6, 2015, together with an English translation.

* cited by examiner

SEAL GAS SUPPLY CONTROL METHOD, SEAL GAS SUPPLY CONTROL APPARATUS, AND ROTARY MACHINE

TECHNICAL FIELD

The present invention relates to a seal gas supply control method, a seal gas supply control apparatus, and a rotary machine.

Priority is claimed on Japanese Patent Application No. 2014-235452, filed on Nov. 20, 2014, the content of which is incorporated herein by reference.

BACKGROUND ART

In rotary machines such as a centrifugal compressor, there is a rotary machine in which an end portion of a rotary shaft protrudes outside a casing so as to input and output a rotation of the rotary shaft rotatably provided in the casing. In this rotary machine, it is necessary to prevent a working fluid inside the casing from leaking from a gap between the rotary shaft and a shaft insertion hole which is formed in the casing and through which the rotary shaft penetrates the inside and the outside of the casing to the outside of the casing and to prevent foreign matters or like from entering the inside of the casing from the outside. Accordingly, a configuration in which a dry gas seal portion is provided between the rotary shaft and the casing is used.

The dry gas seal portion includes a rotary ring and a stationary ring. The rotary ring is integrally provided with the rotary shaft on an outer periphery portion of the rotary shaft. The stationary ring is fixed to the casing and is provided to face the rotary ring in an axial direction of the rotary shaft. The stationary ring is pressed toward the rotary ring by a coil spring or the like. Accordingly, the stationary ring and the rotary ring abut on each other in a state where the rotary machine stops. Spiral grooves are formed on a surface of the rotary ring facing the stationary ring. If the rotary shaft rotates in a state where the rotary machine is operated and a seal gas is supplied, the seal gas is introduced into a portion between the rotary ring and the stationary ring through the spiral grooves. The stationary ring is pressed in the axial direction of the rotary shaft against a biasing force of the coil spring by a pressure of the seal gas. Accordingly, a minute clearance is generated between the rotary ring and the stationary ring. The seal gas flows from a supply portion side to which a supply pipe for supplying the seal gas to the inside of the machine through the clearance is connected toward the outside of the machine to which a vent for evacuating the seal gas is connected, and thus, a portion between the rotary shaft and the casing is sealed. In this case, the supply pressure is higher than an external pressure of the machine such that the seal gas flows from the supply portion side to the outside of the machine.

In the dry gas seal portion, the seal gas which flows from the supply portion side toward the outside of the machine through the clearance between the rotary ring and the stationary ring is evacuated from a flare (funnel) to the outside through the vent which is connected to the casing.

A gas or the like evacuated from a device installed in a plant in addition of the rotary machine is fed to the flare and may be evacuated to the outside along the seal gas. According to a kind of the gas, the gas may be combusted in the vicinity of an outlet of the flare. If the gas or the like is fed to the flare from the device in addition to the rotary machine or the gas is combusted, a pressure inside the vent increases. If the pressure inside the vent is higher than the supply pressure, the external pressure of the machine is higher than the supply pressure, the seal gas backflows in the clearance between the rotary ring and the stationary ring. As a result, in the dry gas seal portion, the clearance is not formed between the rotary ring and the stationary ring, and the rotary ring and the stationary ring are likely to come into contact with each other and to be damaged.

PTL 1 discloses a configuration which includes an accumulator which absorbs gas which backflows from a tip side of a flare when an increase in a pressure on the flare side occurs. Accordingly, it is possible to prevent a gas from flowing from the tip side of the flare to a dry gas seal portion.

A configuration is also adopted, which includes a vent pressure detection sensor which detects a pressure in a vent, a seal gas pressure detection sensor which detects a supply pressure, and a pressure adjustment valve which adjusts a pressure of a supplied seal gas.

In this configuration, in a case where the pressure in the vent is higher than the pressure on the supply portion side, an opening degree of the pressure adjustment valve is adjusted to increase the pressure of the supplied seal gas. Accordingly, the supply pressure increases, the supply pressure is higher than the external pressure (vent pressure) of the machine, and thus, the backflow of the seal gas in the dry gas seal portion is prevented.

CITATION LIST

Patent Literature

[PTL 1] US Unexamined Patent Application Publication No. 2007/0147988

SUMMARY OF INVENTION

Technical Problem

However, it is not understood how much the vent pressure due to other devices in addition to the rotary machine increases. For example, in a case where a safety valve is operated due to other devices such as a pressure container and a pressure is released, the increase in the vent pressure due to the gas fed into the flare through the safety valve becomes abrupt. In this case, even when the opening degree of the pressure adjustment valve is adjusted, the increase of the internal pressure of the machine is likely to be late for the increase in the vent pressure. As a result, the seal gas backflows, and the rotary ring and the stationary ring are likely to collide with each other.

The present invention provides a seal gas supply control method, a seal gas supply control apparatus, and a rotary machine in which it is possible to prevent the external pressure of the machine from being higher than the supply pressure and it is possible to increase reliability of the rotary machine even when an abrupt increase in the vent pressure occurs.

Solution to Problem

According to a first aspect of the present invention, there is provided a seal gas supply control method with respect to a dry gas seal portion which seals the inside and outside of a rotary machine by a seal gas. The seal gas supply control method includes: a step of detecting a pressure difference between an internal pressure of the rotary machine and a supply pressure of the seal gas with respect to the dry gas seal portion; a step of adjusting an opening degree of a seal gas supply valve which supplies the seal gas to the inside of the rotary machine on the basis of the detected pressure difference between the internal pressure and the supply pressure; and a step of detecting a pressure of a vent portion, which discharges the seal gas evacuated from the dry gas seal portion to the outside, on the outside of the rotary machine of the dry gas seal portion. In the seal gas supply control method, the seal gas supply valve fully opens when the detected vent pressure satisfies a predetermined condition.

In this case, in the case where the vent pressure satisfies the predetermined condition, the seal gas supply valve fully opens, and it is possible to cause the supply pressure of the seal gas to be the maximum. Accordingly, even when an abrupt increase in the vent pressure occurs, it is possible to reliably prevent backflow of the seal gas in the dry gas seal portion.

In the seal gas supply control method according to a second aspect of the present invention, in the first aspect, the predetermined condition may be a condition in which the pressure difference between the vent pressure and the supply pressure of the seal gas is less than a predetermined threshold value.

According to this configuration, in a case where the pressure difference of the seal supply pressure with respect to the vent pressure is small, that is, the vent pressure is high, the seal gas supply valve fully opens.

In the seal gas supply control method according to a third aspect of the present invention, in the first aspect, the predetermined condition may be a condition in which the vent pressure exceeds a predetermined threshold value.

According to this configuration, the seal gas supply valve fully opens if the vent pressure exceeds the predetermined threshold value without detecting the pressure difference between the vent pressure and the seal supply pressure.

According to a fourth aspect of the present invention, there is provided a seal gas supply control apparatus with respect to a dry gas seal portion which seals the inside and outside of a rotary machine by a seal gas. The seal gas supply control apparatus includes: seal gas differential pressure detection means for detecting a pressure difference between an internal pressure of the rotary machine and a supply pressure of the seal gas with respect to the dry gas seal portion; seal gas pressure adjustment means for adjusting an opening degree of a seal gas supply valve which supplies the seal gas to the inside of the rotary machine on the basis of the detected pressure difference between the internal pressure and the supply pressure; and vent pressure detection means for detecting a pressure of a vent portion, which discharges the seal gas evacuated from the dry gas seal portion to the outside, on the outside of the rotary machine of the dry gas seal portion. The seal gas supply control apparatus fully opens the seal gas supply valve when the detected vent pressure satisfies a predetermined condition.

According to a fifth aspect of the present invention, there is provided a rotary machine, including: a rotary shaft which penetrates the inside and outside of a casing and is rotatably provided; a rotary ring which integrally rotates with the rotary shaft; a stationary ring which is provided in the casing, abuts on the rotary ring over the entire periphery when the rotary shaft stops, and forms a seal clearance between the stationary ring and the rotary ring when the rotary shaft rotates; a seal gas supply path which supplies a seal gas to the seal clearance; a vent portion which discharges the seal gas evacuated from the seal clearance to the outside on the outsides of the rotary machine of the rotary ring and the stationary ring; a seal gas supply valve which adjusts a supply pressure of the seal gas in the seal gas supply path; and a controller which adjusts an opening degree of the seal gas supply valve. The controller detects a vent pressure which discharges the seal gas evacuated from the seal clearance to the outside and fully opens the seal gas supply valve when the detected vent pressure satisfies a predetermined condition.

Advantageous Effects of Invention

According to the above-described seal gas supply control method, seal gas supply control apparatus, and rotary machine, in the case where the vent pressure satisfies the predetermined condition, the seal gas supply valve fully opens, and it is possible to cause the supply pressure of the seal gas to be the maximum. Accordingly, even when an abrupt increase in the vent pressure occurs, it is possible to reliably prevent backflow of the seal gas in the dry gas seal portion.

DESCRIPTION OF EMBODIMENTS

Hereinafter, embodiments of a rotary machine according to the present invention will be described with reference to the drawings.

First Embodiment

Figure 1:
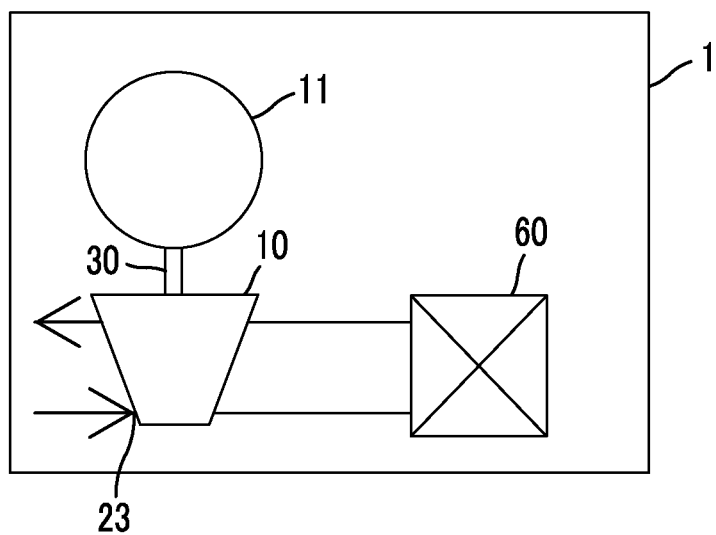
FIG. 1 is a schematic view showing an overall configuration of a rotary machine according to an embodiment of the present invention.

FIG. 1 is a sectional view showing a configuration of a centrifugal compressor which is an example of a rotary machine according to the present embodiment.

As shown in FIG. 1, a centrifugal compressor (rotary machine) 10 which is the rotary machine according to the present embodiment is connected to a driving machine 11 which rotates the centrifugal compressor 10 to be coaxial with the driving machine 11. The centrifugal compressor 10 is connected to a dry gas seal portion 60 by a pipe. The centrifugal compressor 10 is disposed on a base plate 1 along with the driving machine 11 or a seal gas pressure adjustment portion (seal gas supply control apparatus) 80A.

For example, the compressor 10 is a centrifugal compressor. The compressor 10 includes a rotary shaft 30 which is rotated by the driving machine 11 and an impeller (not shown) which integrally rotates with the rotary shaft 30 in the casing. The compressor 10 compresses a working fluid.

The dry gas seal portion 60 is provided on the end portion of the rotary shaft 30 between the casing and the rotary shaft 30. The dry gas seal portion 60 is disposed on a side of the casing closer to the inside of the machine than a bearing due to the end portion of the rotary shaft 30.

Figure 2:
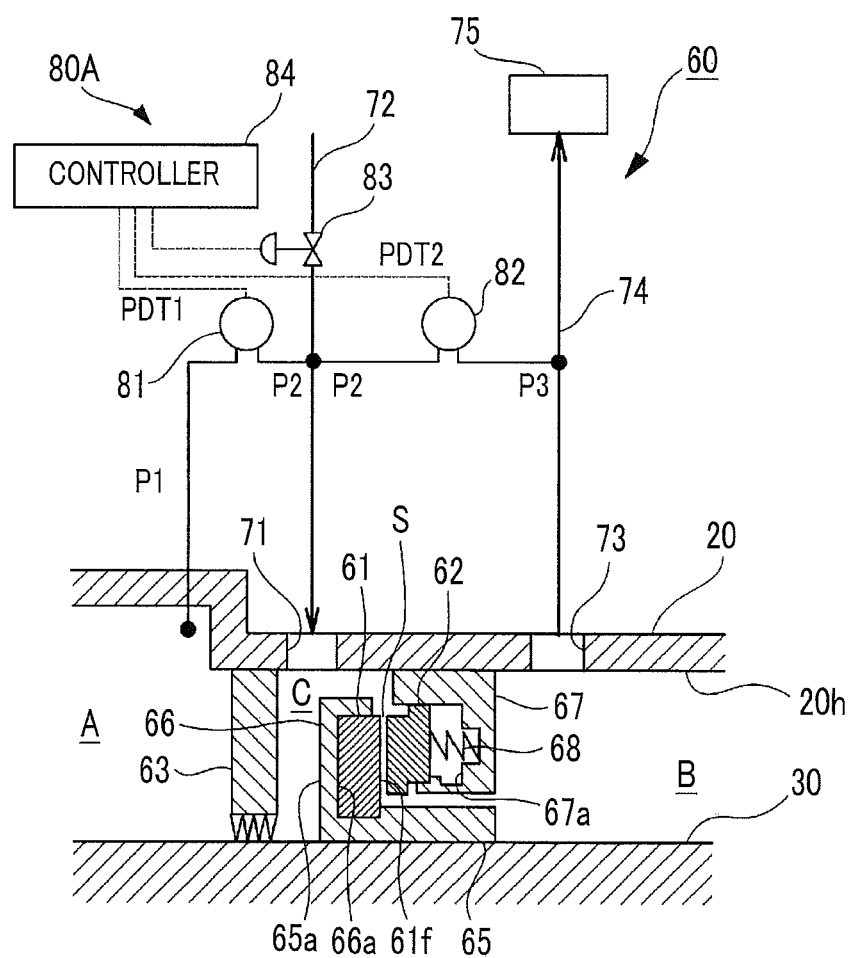
FIG. 2 is a view showing configurations of a dry gas seal portion and a seal gas pressure adjustment portion provided in a centrifugal compressor according to a first embodiment.

FIG. 2 is a view showing configurations of a dry gas seal portion and a seal gas pressure adjustment portion provided in a centrifugal compressor according to a first embodiment.

As shown in FIG. 2, the dry gas seal portion 60 includes a rotary ring 61, a stationary ring 62, and an in-machine side labyrinth seal 63.

The rotary ring 61 is integrally provided with the rotary shaft 30 on an outer periphery portion of the rotary shaft 30. A tubular shaft sleeve 65 is fixed to the outer periphery portion of the rotary shaft 30. A holder portion 66 which extends to the outer periphery side is formed on an end portion 65a on the shaft sleeve 65 in the inside A of the machine (a left side on a paper surface in FIG. 2). A holding recessed portion 66a which holds the rotary ring 61 is formed on the outside B of the machine (a right side on the paper surface in FIG. 2) of the holder portion 66. The rotary ring 61 has an annular shape. The rotary ring 61 is fitted to the holding recessed portion 66a so as to be held. Spiral grooves (not shown) are formed on a surface 61f of the rotary ring 61 facing the stationary ring 62.

The stationary ring 62 is fixed to a casing 20. A shaft insertion hole 20h is formed on each of both end portions 20a and 20b of the casing 20. An annular retainer 67 is provided on an inner peripheral surface of the shaft insertion hole 20h through which the rotary shaft 30 penetrates the inside and outside of the casing 20 so as to be inserted. A holding recessed portion 67a which holds the stationary ring 62 is formed in the inside A of the machine of the retainer 67. In the holding recessed portion 67a, the stationary ring 62 is slidably provided in an axial direction of the rotary shaft 30. A coil spring 68, which biases the stationary ring 62 toward the inside A of the machine, is provided inside the holding recessed portion 67a between the stationary ring 62 and the retainer 67.

The rotary ring 61 and the stationary ring 62 are provided so as to face each other in the axial direction of the rotary shaft 30. The stationary ring 62 is pressed toward the rotary ring 61 by the coil spring 68.

A seal gas supply portion 71 which opens to the inner peripheral surface of the shaft insertion hole 20h is formed in the casing 20. The seal gas supply port 71 is formed between the rotary ring 61 and the in-machine side labyrinth seal 63 in the axial direction of the rotary shaft 30.

A seal gas supply path 72 which is a pipe is connected to the seal gas supply port 71. The seal gas supply path 72 is connected to a discharge side of the centrifugal compressor 10. A portion of a compressed fluid which is compressed by the centrifugal compressor 10 is supplied to the seal gas supply port 71 through the seal gas supply path 72 as a seal gas.

A flare evacuation port 73 which opens to the inner peripheral surface of the shaft insertion hole 20h is formed in the casing 20. The flare evacuation port 73 is formed so as to be closer to the outside B of the machine than the rotary ring 61 in the axial direction of the rotary shaft 30.

A vent portion 74 is connected to the flare evacuation port 73. The vent portion 74 is a pipe which connects the flare evacuation port 73 and a flare (funnel) 75 to each other. The seal gas which is evacuated from a seal clearance is discharged to the outside through the vent portion 74. The vent portion 74 causes the seal gas, which flows in from the dry gas seal portion 60 via the flare evacuation port 73, to be discharged from the flare 75 to the outside via the vent portion 74. Other devices in addition to the centrifugal compressor 10 are connected to the flare 75.

In this dry gas seal portion 60, when the rotary shaft 30 stops in which the centrifugal compressor 10 stops, the stationary ring 62 and the rotary ring 61 abut on each other over the entire periphery.

When the rotary shaft 30 rotates in which the centrifugal compressor 10 is operated, the seal gas is introduced from the seal gas supply port 71 to a supply portion C which is a space between the shaft insertion hole 20h of the casing 20 and the rotary shaft 30 via the seal gas supply path 72. If the centrifugal compressor 10 is operated and the rotary shaft 30 rotates, the seal gas is introduced from the outer periphery side of the rotary ring 61 to a portion between the rotary ring 61 and the stationary ring 62 by the spiral grooves formed on the surface 61f of the rotary ring 61. If the stationary ring 62 is pressed toward the outside B of the machine in the axial direction of the rotary shaft 30 against the biasing force of the coil spring 68 by the pressure of the seal gas, a minute seal clearance S is generated between the rotary ring 61 and the stationary ring 62. The seal gas flows toward the outside B of the machine through the seal clearance S. In this way, since the seal gas flows from the inside A of machine toward the outside B of the machine, the portion between the rotary shaft 30 and the casing 20 is sealed.

The seal gas flows from the rotary ring 61 side and the stationary ring 62 side to the inside A of the machine through the portion between the in-machine side labyrinth seal 63 and the rotary shaft 30. Accordingly, it is possible to prevent foreign matters or the like from entering the seal clearance S between the rotary ring 61 and the stationary ring 62 from the inside A of the machine.

Here, in order to prevent backflow in the dry gas seal portion 60 of the seal gas introduced into the casing 20, the pressure of the supply portion C is higher than the pressure of the inside A of the machine. Accordingly, the centrifugal compressor 10 includes a seal gas pressure adjustment portion (seal gas supply control apparatus) 80A which adjusts the pressure of the seal gas supplied to the dry gas seal portion 60.

The seal gas pressure adjustment portion 80A includes an internal pressure differential pressure gauge (seal gas differential pressure detection means) 81, a vent pressure differential pressure gauge (vent pressure detection means) 82, a pressure adjustment valve (seal gas supply valve) 83, and a controller (seal gas pressure adjustment means) 84.

The internal pressure differential pressure gauge 81 measures an internal pressure P1 and a supply pressure P2. The internal pressure P1 is a pressure of a side closer to the inside (inside A of the machine) of the casing 20 than the dry gas seal portion 60. The supply pressure P2 is a pressure of the seal gas in the supply portion C which is supplied into the casing 20 through the seal gas supply path 72. The internal pressure differential pressure gauge 81 detects an internal pressure difference PDT1 (=P2−P1) which is the pressure difference between the internal pressure P1 and the supply pressure P2.

The vent pressure differential pressure gauge 82 detects a vent pressure difference PDT2 (=P2−P1) which is a pressure difference between a vent pressure P3 and a supply pressure P2 in the vent portion 74.

The pressure adjustment valve 83 changes an opening degree of the pressure adjustment valve 83 to adjust the supply pressure P2 of the seal gas which is supplied into the casing 20 through the seal gas supply path 72. The pressure adjustment valve 83 automatically adjusts the opening degree by the controller 84.

Figure 3:
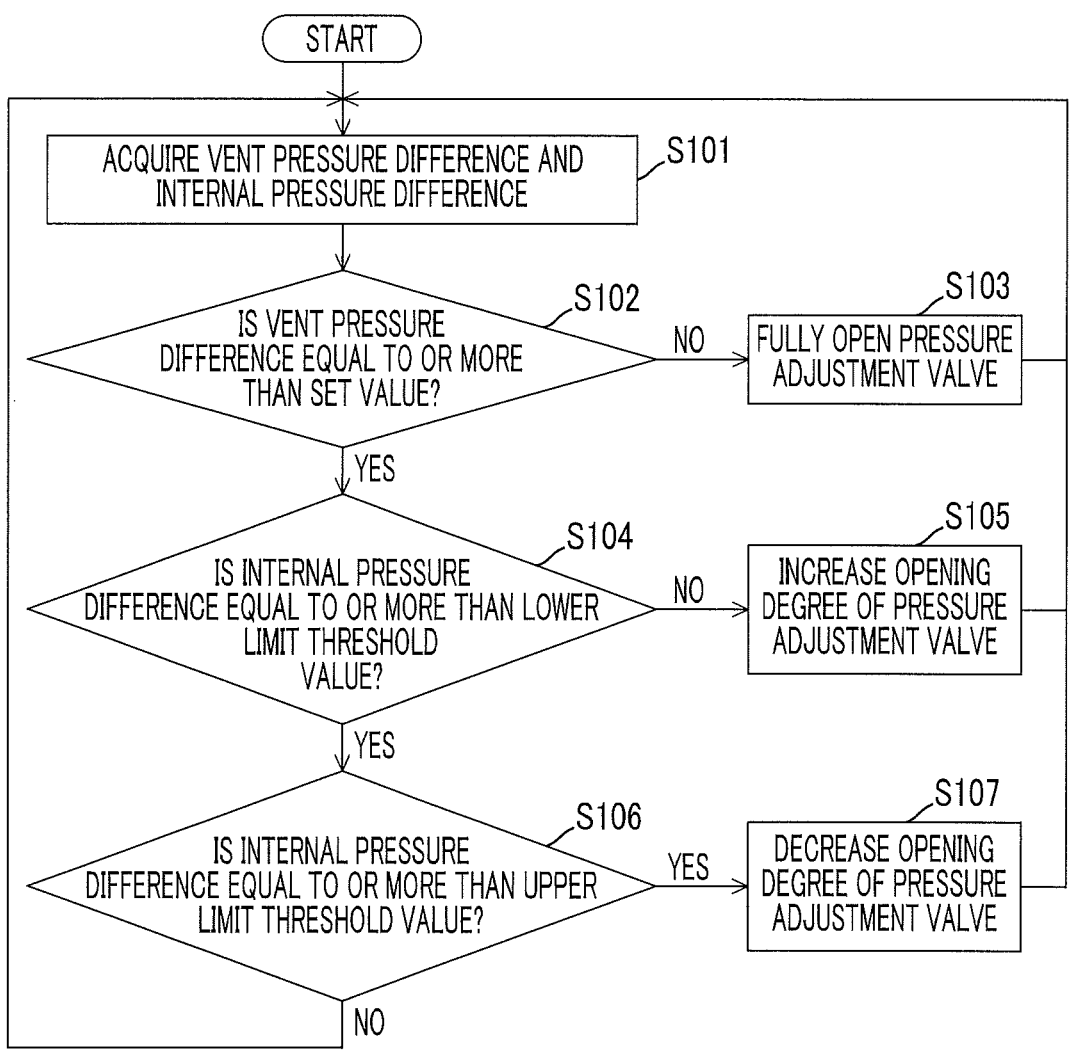
FIG. 3 is a flowchart showing a flow of a seal gas pressure control method in a controller according to the first embodiment.

FIG. 3 is a flowchart showing a flow of a seal gas pressure control method in the controller.

As shown in FIG. 3, the controller 84 detects the vent pressure P3 which discharges the seal gas evacuated from the seal clearance S from the vent portion 74 to the outside via the flare 75. The controller 84 fully opens the pressure adjustment valve 83 when the detected vent pressure P3 satisfies a predetermined condition. In a case where the vent pressure difference PDT2 is less than a predetermined threshold value as the predetermined condition, the controller 84 of the first embodiment fully opens the pressure adjustment valve 83. If the centrifugal compressor 10 is operated, the controller 84 acquires the internal pressure difference PDT1 detected by the internal pressure differential pressure gauge 81 and the vent pressure difference PDT2 detected by the vent pressure differential pressure gauge 82 (Step S101).

Subsequently, it is determined whether or not the vent pressure difference PDT2 detected by the vent pressure differential pressure gauge 82 is equal to or more than a predetermined set value (Step S102). For example, preferably, the set value is set to a value which is smaller than an increase in the pressure inside the vent portion 74 according to an increase in the pressure inside the flare 75 generated in a case where a safety valve is released from other devices in addition to the centrifugal compressor 10.

As the result of the determination, in a case where the vent pressure difference PDT2 exceeds the predetermined set value, the operation is continued as it is, and the subsequent processing is performed.

In addition, if the vent pressure difference PDT2 is less than the predetermined set value, the opening degree of the pressure adjustment valve 83 becomes a full opening (Step S103).

For example, the case where the vent pressure difference PDT2 exceeds the set value includes a case where the safety valve is released from the outer devices in addition to the centrifugal compressor 10, or the like. In this case, if the pressure adjustment valve 83 fully opens, the supply pressure P2 of the seal gas becomes the maximum.

Subsequently, it is determined whether or not the detected internal pressure difference PDT1 is equal to or more than a predetermined lower limit threshold value (Step S104).

As a result, if the internal pressure difference PDT1 is equal to or more than the predetermined lower limit threshold value and the supply pressure P2 of the seal gas is sufficiently higher than the internal pressure P1 in the inside A of the machine, the opening degree of the pressure adjustment valve 83 is not changed, and the operation is continued as it is.

In addition, in a case where the internal pressure difference PDT1 is less than the predetermined lower limit threshold value, since the supply pressure P2 of the seal gas is not sufficiently higher than the internal pressure P1 in the inside A of the machine, the opening degree of the pressure adjustment valve 83 is increased (Step S105). Accordingly, the supply pressure P2 of the seal gas which is supplied into the casing 20 through the seal gas supply path 72 on the basis of the internal pressure difference PDT1 increases. As a result, the internal pressure difference PDT1 between the supply pressure P2 of the seal gas and the internal pressure P1 in the inside A of the machine increases.

In addition, here, in the case where the internal pressure difference PDT1 is less than the predetermined lower limit threshold value, the pressure adjustment valve 83 increases the opening degree. For example, an amount of change of the opening degree may be an amount of the set opening degree which is predetermined according to the magnitude of the internal pressure difference PDT1 and the opening degree of the pressure adjustment valve 83 may be increased by a constant amount every one-time calculation.

In addition, it is determined whether or not the internal pressure difference PDT1 is equal to or more than a predetermined upper limit threshold value (Step S106).

As a result, in a case where the internal pressure difference PDT1 exceeds the predetermined upper limit threshold value, the supply pressure P2 of the seal gas is excessively higher than the internal pressure P1 in the inside A of the machine, the flow rate of the seal gas which flows into the inside A of the machine increases, and the flow rate of the working fluid which is compressed by the centrifugal compressor 10 decreases. Accordingly, the controller 84 decreases the opening degree of the pressure adjustment valve 83 on the basis of the internal pressure difference PDT1 (Step S107).

Moreover, in a case where the internal pressure difference PDT1 is less than the predetermined upper limit threshold value in Step S106, the opening degree of the pressure adjustment valve 83 is not changed, the operation is continued as it is, and the processing is repeatedly performed.

According to the above-described seal gas supply control method, seal gas supply control apparatus, rotary machine, in the case where the vent pressure difference PDT2 between the vent pressure P3 inside the flare 75 and the seal gas supply pressure P2 is smaller than the predetermined threshold value, the pressure adjustment valve 83 fully opens, and the supply pressure P2 of the seal gas can be the maximum. Accordingly, even when an abrupt increase in the pressure inside the flare 75 occurs in the dry gas seal portion 60, it is possible to reliably prevent backflow of the seal gas from the supply portion C side to the outside B of the machine. Accordingly, it is possible to prevent the rotary ring 61 and the stationary ring 62 from colliding with each other and to prevent the dry gas seal portion 60 from being damaged, and it is possible to increase reliability of the centrifugal compressor 10.

Second Embodiment

Next, second embodiments of the seal gas supply control method, the seal gas supply control apparatus, and the rotary machine according to the present invention will be described. In addition, in the second embodiment described below, the same reference numerals are assigned to configurations similar to those of the first embodiment, and descriptions thereof are omitted.

Figure 4:
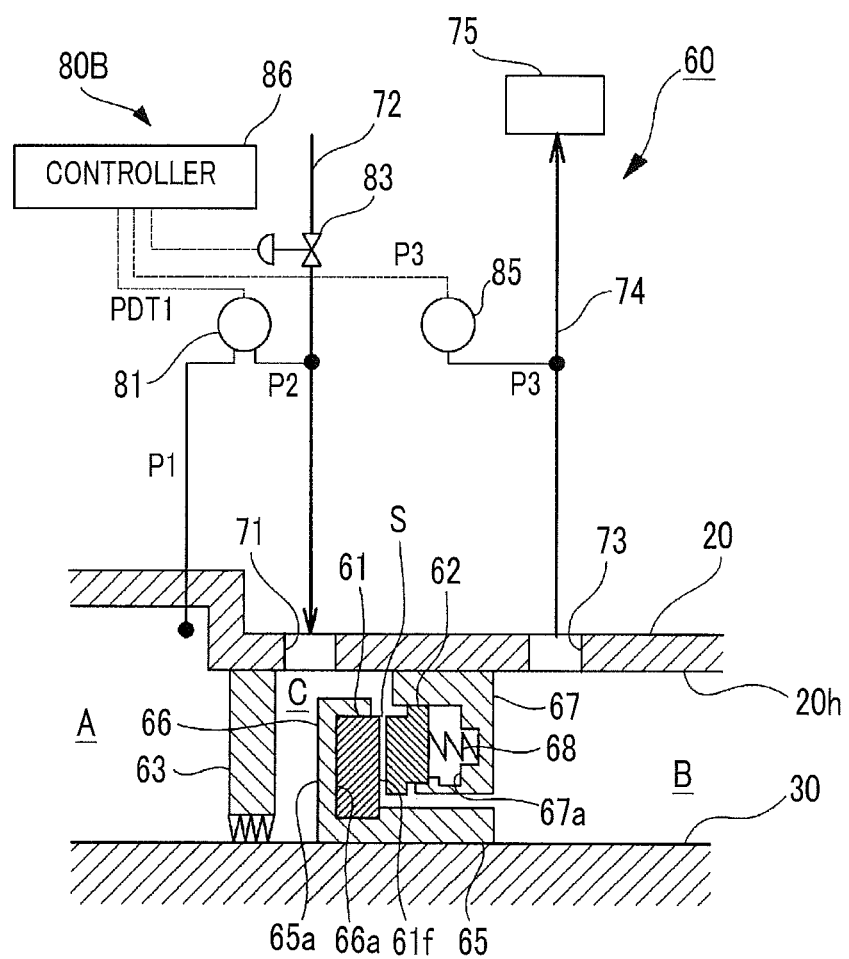
FIG. 4 is a view showing configurations of a dry gas seal portion and a seal gas pressure adjustment portion provided in a centrifugal compressor according to a second embodiment.

FIG. 4 a view showing configurations of a dry gas seal portion and a seal gas pressure adjustment portion provided in a centrifugal compressor according to the second embodiment.

The centrifugal compressor 10 of the present embodiment has the configuration similar to that of the first embodiment. As shown in FIG. 1, the dry gas seal portion 60 is provided on the end portion of a suction port 23 side of the rotary shaft 30 of the centrifugal compressor 10 between the casing 20 and the rotary shaft 30. As shown in FIG. 4, the dry gas seal portion 60 includes the rotary ring 61, the stationary ring 62, and the in-machine side labyrinth seal 63.

The rotary ring 61 and the stationary ring 62 are provided so as to face each other in the axial direction of the rotary shaft 30. The stationary ring 62 is pressed toward the rotary ring 61 by the coil spring 68.

In this dry gas seal portion 60, in a state where the centrifugal compressor 10 stops, the stationary ring 62 and the rotary ring 61 abut on each other.

In a case where the centrifugal compressor 10 is operated, the seal gas is introduced from the outer periphery side of the rotary ring 61 to the portion between the rotary ring 61 and the stationary ring 62 by the spiral grooves formed on the surface 61f of the rotary ring 61. If the stationary ring 62 is pressed toward the outside B of the machine in the axial direction of the rotary shaft 30 by the pressure of the seal gas, the minute seal clearance S is generated between the rotary ring 61 and the stationary ring 62. The seal gas flows toward the outside B of the machine through the seal clearance S.

The centrifugal compressor 10 includes a seal gas pressure adjustment portion (seal gas supply control apparatus) 80B which adjusts the pressure of the seal gas supplied to the dry gas seal portion 60.

The seal gas pressure adjustment portion 80B includes the internal pressure differential pressure gauge 81, a vent pressure sensor (vent pressure detection means) 85, a pressure adjustment valve 83, and a controller (seal gas pressure adjustment means) 86.

The internal pressure differential pressure gauge 81 detects the internal pressure difference PDT1=(P2−P1) between the internal pressure P1 in the inside A of the machine and the supply pressure P2 of the seal gas.

The vent pressure sensor 85 detects the vent pressure P3 inside the vent portion 74.

The pressure adjustment valve 83 changes an opening degree of the pressure adjustment valve 83 to adjust the supply pressure P2 of the seal gas which is supplied into the casing 20 through the seal gas supply path 72. The pressure adjustment valve 83 automatically adjusts the opening degree by the controller 86.

Figure 5:
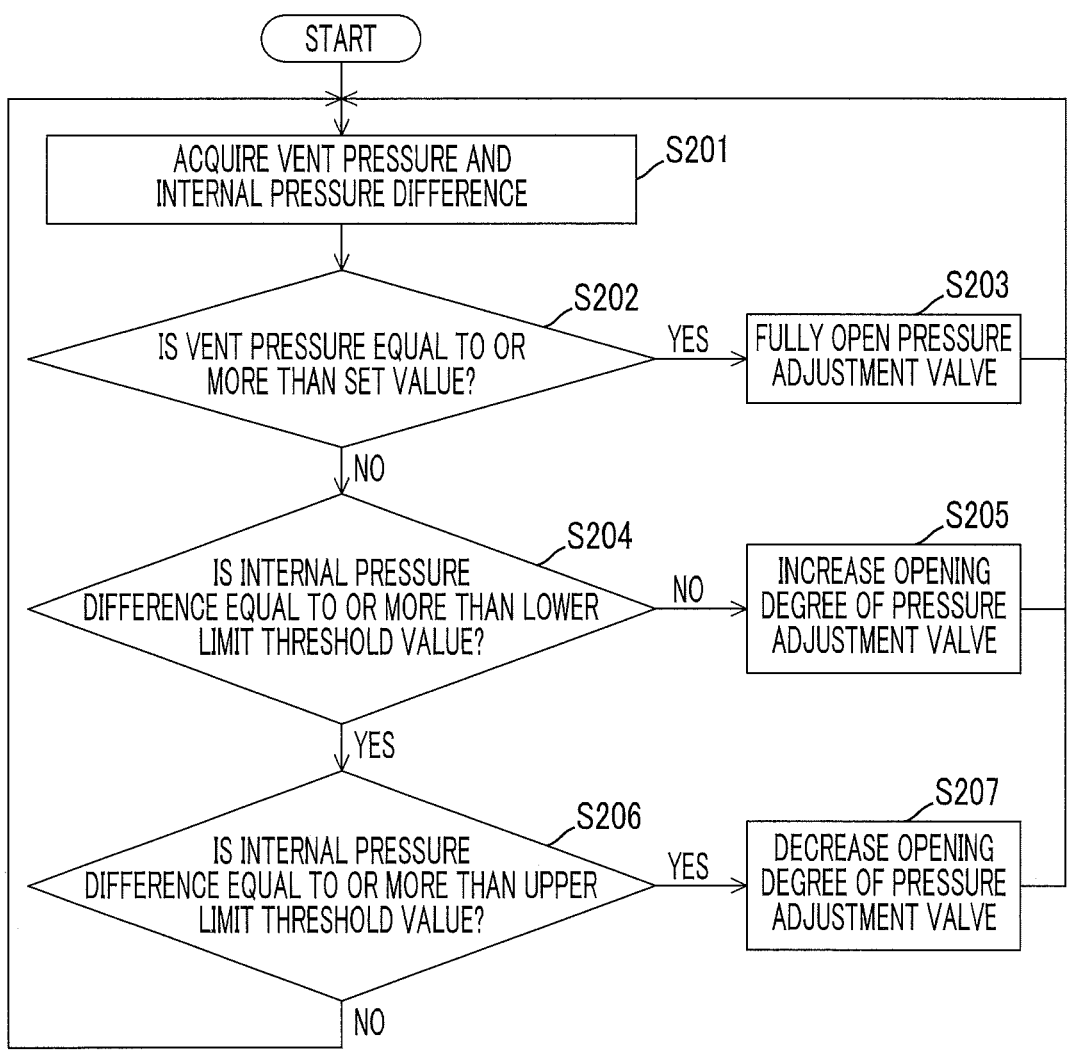
FIG. 5 is a flowchart showing a flow of a seal gas pressure control method in a controller according to the second embodiment.

FIG. 5 is a flowchart showing a flow of a seal gas pressure control method in the controller.

As shown in FIG. 5, in a case where the vent pressure P3 exceeds a predetermined threshold value as the predetermined condition, the controller 86 of the second embodiment fully opens the pressure adjustment valve 83. If the centrifugal compressor 10 is operated, the controller 86 acquires the internal pressure difference PDT1 detected by the internal pressure differential pressure gauge 81 and the vent pressure P3 detected by the vent pressure sensor 85 (Step S201).

Subsequently, it is determined whether or not the vent pressure P3 detected by the vent pressure sensor 85 is equal to or more than a predetermined set value (Step S202).

As the result of the determination, in a case where the vent pressure P3 is less than the predetermined set value, the operation is continued as it is, and the subsequent processing is performed.

In addition, if the vent pressure P3 exceeds the predetermined set value, the opening degree of the pressure adjustment valve 83 becomes a full opening (Step S203).

For example, the case where the vent pressure P3 exceeds the set value includes a case where the safety valve is released from the outer devices in addition to the centrifugal compressor 10, or the like. In this case, if the pressure adjustment valve 83 fully opens, the supply pressure P2 of the seal gas becomes the maximum.

Subsequently, it is determined whether or not the detected internal pressure difference PDT1 is equal to or more than a predetermined lower limit threshold value (Step S204).

As a result, if the internal pressure difference PDT1 is equal to or more than the predetermined lower limit threshold value and the supply pressure P2 of the seal gas is sufficiently higher than the internal pressure P1 in the inside A of the machine, the opening degree of the pressure adjustment valve 83 is not changed, and the operation is continued as it is.

In addition, in a case where the internal pressure difference PDT1 is less than the predetermined lower limit threshold value, since the supply pressure P2 of the seal gas is not sufficiently higher than the internal pressure P1 in the inside A of the machine, the opening degree of the pressure adjustment valve 83 is increased (Step S205). Accordingly, the supply pressure P2 of the seal gas which is supplied into the casing 20 through the seal gas supply path 72 increases. As a result, the internal pressure difference PDT1 between the supply pressure P2 of the seal gas and the internal pressure P1 in the inside A of the machine increases.

In addition, it is determined whether or not the internal pressure difference PDT1 is equal to or more than a predetermined upper limit threshold value (Step S206).

As a result, in a case where the internal pressure difference PDT1 exceeds the predetermined upper limit threshold value, the supply pressure P2 of the seal gas is excessively higher than the internal pressure P1 in the inside A of the machine, the flow rate of the seal gas which flows into the inside A of the machine increases, and the flow rate of the working fluid which is compressed by the centrifugal compressor 10 decreases. Accordingly, the controller 86 decreases the opening degree of the pressure adjustment valve 83 (Step S207).

Moreover, in a case where the internal pressure difference PDT1 is less than the predetermined upper limit threshold value in Step S206, the opening degree of the pressure adjustment valve 83 is not changed, the operation is continued as it is, and the processing is repeatedly performed.

According to the above-described seal gas supply control method, seal gas supply control apparatus, rotary machine, in the case where the pressure inside the vent portion 74 exceeds the predetermined threshold value, the pressure adjustment valve 83 fully opens. According to this configuration, the pressure adjustment valve 83 fully opens without detecting the pressure difference between the pressure inside the vent portion 74 and the seal supply pressure P2, and it is possible to cause the supply pressure P2 of the seal gas to be the maximum. Accordingly, even when an abrupt increase in the pressure inside the vent portion 74 occurs, it is possible to reliably prevent backflow of the seal gas in the dry gas seal portion 60. Therefore, it is possible to prevent the rotary ring 61 and the stationary ring 62 from colliding with each other and to prevent the dry gas seal portion 60 from being damaged, and it is possible to increase reliability of the centrifugal compressor 10.

Compared to the first embodiment, in the second embodiment, the vent pressure sensor 85 which directly detects the vent pressure P3 is used instead of the vent pressure differential pressure gauge 82 which detects the vent pressure difference PDT2 between the vent pressure P3 inside the vent portion 74 and the supply pressure P2 of the seal gas. Accordingly, it is possible to reduce a cost of the machine.

Other Embodiments

In addition, the seal gas supply control method, the seal gas supply control apparatus, and the rotary machine of the present invention are not limited to the above-described embodiments which are described with reference to the drawings, and various modification examples may be considered within a technical scope.

For example, the dry gas seal portion 60 may be disposed inside the centrifugal compressor. Specifically, the centrifugal compressor 10 which is the rotary machine may mainly include the casing 20, the rotary shaft 30 which is rotatably supported around the center axis in the casing 20, an impeller which is attached to the rotary shaft 30 and compresses the gas G using a centrifugal force, and the dry gas seal portion 60 which is accommodated in the casing 20.

For example, a needle valve or the like may be used as the pressure adjustment valve 83.

In addition, the configuration of the dry gas seal portion 60 may be appropriately changed.

Moreover, for example, the overall configuration of the centrifugal compressor 10 may have any configuration.

INDUSTRIAL APPLICABILITY

According to the seal gas supply control method, in the case where the vent pressure satisfies the predetermined condition, the seal gas supply valve fully opens, and it is possible to cause the supply pressure of the seal gas to be the maximum. Accordingly, even when an abrupt increase in the vent pressure occurs, it is possible to reliably prevent backflow of the seal gas in the dry gas seal portion.

REFERENCE SIGNS LIST

10: centrifugal compressor (rotary machine)
20: casing
20a: one end portion
20b: the other end portion
20h: shaft insertion hole
23: suction port
30: rotary shaft
40: impeller
60: dry gas seal portion
61: rotary ring
61f: surface
62: stationary ring
63: in-machine side labyrinth seal
65: shaft sleeve
65a: end portion
66: holder portion
66a: holding recessed portion
67: retainer
67a: holding recessed portion
68: coil spring
71: seal gas supply port
72: seal gas supply path
73: flare evacuation port
74: vent portion
75: flare
80A, 80B: seal gas pressure adjustment portion (seal gas supply control apparatus)
81: internal pressure differential pressure gauge (seal gas differential pressure detection means)
82: vent pressure differential pressure gauge (vent pressure detection means)
83: pressure adjustment valve (seal gas supply valve)
84: controller (seal gas pressure adjustment means)
85: vent pressure sensor (vent pressure detection means)
86: controller (seal gas pressure adjustment means)
A: inside of machine
B: outside of machine
G: gas
P1: internal pressure
P2: supply pressure
P3: vent pressure
PDT1: internal pressure difference
PDT2: vent pressure difference
S: clearance

The invention claimed is:

1. A seal gas supply control method with respect to a dry gas seal portion which seals the inside and outside of a rotary machine by a seal gas, the method comprising:
a step of detecting a pressure difference between an internal pressure of the rotary machine and a supply pressure of the seal gas with respect to the dry gas seal portion;
a step of adjusting an opening degree of a seal gas supply valve which supplies the seal gas to the inside of the rotary machine on the basis of the detected pressure difference between the internal pressure and the supply pressure; and
a step of detecting a vent pressure difference between an internal pressure of the rotary machine and a vent portion, which discharges the seal gas evacuated from the dry gas seal portion to the outside, on the outside of the rotary machine of the dry gas seal portion,
wherein the seal gas supply valve is fully opened when the detected vent pressure difference is not equal to or more than a set value, and
after determining that the detected vent pressure difference is not equal to or more than a set value, an opening degree of the seal gas supply valve is increased when the detected pressure difference between the internal pressure and the supply pressure is less than a predetermined lower limit threshold value,
after determining whether or not the pressure difference between the internal pressure and the supply pressure is less than the predetermined lower limit threshold value, the pressure difference is determined whether or not the pressure difference is equal to or more than a predetermined upper limit threshold value, when the pressure difference is equal to or more than the predetermined upper limit threshold value, the opening degree of the seal gas supply valve is decreased, and when the pressure difference is less than the predetermined upper limit threshold value, the opening degree of the seal gas supply valve is not changed,
the method further comprising arranging the seal gas supply in a seal gas supply path which comprises a pipe connected to the dry gas seal portion, and
providing the vent portion as a pipe connected to the dry gas seal portion,
wherein the vent portion is separated from the seal gas supply portion from the dry gas seal portion.

2. A seal gas supply control apparatus with respect to a dry gas seal portion which seals the inside and outside of a rotary machine by a seal gas, the apparatus comprising:
seal gas differential pressure detection means for detecting a pressure difference between an internal pressure of the rotary machine and a supply pressure of the seal gas with respect to the dry gas seal portion;
seal gas pressure adjustment means for adjusting an opening degree of a seal gas supply valve which supplies the seal gas to the inside of the rotary machine on the basis of the detected pressure difference between the internal pressure and the supply pressure; and
vent pressure difference detection means for detecting a pressure between an internal pressure of the rotary machine and a vent portion, which discharges the seal gas evacuated from the dry gas seal portion to the outside, on the outside of the rotary machine of the dry gas seal portion, wherein the seal gas supply valve fully opens when the detected vent pressure difference is not equal to or more than a set value, and after determining that the detected vent pressure difference does is not equal to or more than a set value, an opening degree of the seal gas supply valve is increased when the detected pressure difference between the internal pressure and the supply pressure is less than a predetermined lower limit threshold value, after determining whether or not the pressure difference between the internal pressure and the supply pressure is less than the predetermined lower limit threshold value, the pressure difference is determined whether or not the pressure difference is equal to or more than a predetermined upper limit threshold value, when the pressure difference is equal to or more than the predetermined upper limit threshold value, the opening degree of the seal gas supply valve is decreased, and when the pressure difference is less than the predetermined upper limit threshold value, the opening degree of the seal gas supply valve is not changed, wherein the seal gas supply is arranged in a seal gas supply path which comprises a pipe connected to the dry gas seal portion, and the vent portion comprises a pipe connected to the dry gas seal portion, wherein the vent portion is separated from the seal gas supply portion from the dry gas seal portion.

3. A rotary machine, comprising:

a rotary shaft, which penetrates from the inside to the outside of a casing and is rotatably provided;

a rotary ring which integrally rotates with the rotary shaft;

a stationary ring which is provided in the casing and which abuts on the rotary ring over the entire periphery thereof when the rotary shaft stops, and which forms a seal clearance between the stationary ring and the rotary ring when the rotary shaft rotates;

a seal gas supply path which supplies a seal gas to the seal clearance;

a vent portion which discharges the seal gas evacuated from the seal clearance to the outside on the outsides of the rotary machine of the rotary ring and the stationary ring;

a seal gas supply valve which adjusts a supply pressure of the seal gas in the seal gas supply path; and a controller which adjusts an opening degree of the seal gas supply valve, wherein the controller detects a vent pressure difference which discharges the seal gas evacuated from the seal clearance to the outside and fully opens the seal gas supply valve when the detected vent pressure difference is not equal to or more than a set value, after determining that the detected vent pressure difference does not satisfy the predetermined condition, an opening degree of the seal gas supply valve is increased when the detected pressure difference between the internal pressure and the supply pressure is less than a predetermined lower limit threshold value, after determining whether or not the pressure difference between the internal pressure and the supply pressure is less than the predetermined lower limit threshold value, the pressure difference is determined whether or not the pressure difference is equal to or more than a predetermined upper limit threshold value, when the pressure difference is equal to or more than the predetermined upper limit threshold value, the opening degree of the seal gas supply valve is decreased, and when the pressure difference is less than the predetermined upper limit threshold value, the opening degree of the seal gas supply valve is not changed.

wherein the seal gas supply is arranged in the seal gas supply path which comprises a pipe connected to the dry gas seal portion, and the vent portion comprises a pipe connected to the dry gas seal portion, wherein the vent portion is separated from the seal gas supply portion from the dry gas seal portion.

* * * * *